(12) United States Patent
Hayashizaki et al.

(10) Patent No.: US 6,543,323 B2
(45) Date of Patent: Apr. 8, 2003

(54) VICE DEVICE IN COMPOUND MITER SAW (75) Inventors: Toshihiko Hayashizaki, Ibaraki (JP); Hiromi Ozawa, Ibaraki (JP); Eisaku Oka, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 0 days.

(21) Appl. No.: 09/891,265

(22) Filed: Jun. 27, 2001

(65) Prior Publication Data

US 2002/0007712 A1 Jan. 24, 2002

(30) Foreign Application Priority Data

Jun. 29, 2000 (JP) .................................... 2000-196174

(51) Int. Cl.$^7$ ............................................... B26D 7/04
(52) U.S. Cl. .......................... 83/466; 83/452; 83/471; 83/471.2; 83/471.3; 83/490; 83/468.3; 269/303; 269/71; 269/88; 269/91; 269/240
(58) Field of Search ................... 83/452, 466, 471, 83/471.2, 471.3, 490, 468.3; 269/88, 95, 100, 126, 240, 303

(56) References Cited

U.S. PATENT DOCUMENTS

| 1,474,119 | A | * | 11/1923 | Robertson | 269/249 |
|---|---|---|---|---|---|
| 4,300,426 | A | * | 11/1981 | Weaver | 269/41 |
| 4,875,399 | A | * | 10/1989 | Scott et al. | 269/303 |
| 5,239,905 | A | * | 8/1993 | Dunn | 269/126 |
| 5,526,856 | A | * | 6/1996 | Pedri | 144/286.1 |
| 5,564,323 | A | * | 10/1996 | Sasaki et al. | 83/467.1 |
| 5,644,964 | A | * | 7/1997 | Price | 144/243 |
| 5,839,339 | A | * | 11/1998 | Sasaki et al. | 83/471.3 |
| 6,024,350 | A | * | 2/2000 | Price et al. | 269/246 |
| 6,425,309 | B1 | * | 7/2002 | Stump et al. | 83/468.2 |

* cited by examiner

Primary Examiner—Derris H. Banks
Assistant Examiner—Dmitry Suhol
(74) Attorney, Agent, or Firm—Sughrue Mion, PLLC (57) ABSTRACT The vice device includes a vice holder 24 composed of two side parts connected together at a given angle and, in these two side parts of the vice holder 24, there are respectively formed two holes 24a, 24b which extend at right angles to their associated side parts. By selectively switching these holes 24a, 24b over to each other, the pressing direction of a vice plate 26 can be changed.

10 Claims, 8 Drawing Sheets

VICE DEVICE IN COMPOUND MITER SAW

BACKGROUND OF THE INVENTION

1. Field of the Invention

The present invention relates to a vice device for use in a compound miter saw suitable to cut not only an ordinary member to be cut (that is, a workpiece to be cut) having a rectangular-shaped section (which is hereinafter referred to as a rectangular member) but also an ornamental long extrusion member (a crown-molding member: an ornamental long extrusion member to be mounted along corner portions between a ceiling and walls; some of the such crown-molding members have a mounting angle θ thereof with respect to the ceiling that is set in the range of 38°–45°. This is hereinafter referred to as a crown member).

2. Description of the Related Art

A compound miter saw of this type for cutting the above crown member is disclosed in U.S. Pat. No. 4,875,399. This compound miter saw is structured so as to have a stopper for supporting the counter-fence side front end of the crown member. That is, when cutting the crown member, the stopper is positioned on the upper surface of a base and is allowed to support the crown member; and, when cutting an ordinary rectangular member, the stopper can be retreated from the upper surface of the base.

Also, the compound miter saw, as known well, is often used to cut a workpiece in a state where a circular saw assembly thereof is inclined. Due to this, the fence cannot be set sufficiently high, that is, generally, it is set low.

Therefore, when the crown member is cut while it set against a fence, the compound miter saw is able to cut only the crown member having such a breadth which allows the crown member to be put against a low fence and it is difficult to cut a crown member the breadth of which is too wide for the crown member to be put against the low fence. Also, in order to be able to apply the structure disclosed in U.S. Pat. No. 4,875,399 to an existing compound miter saw, the structure must be improved to a considerable degree.

SUMMARY OF THE INVENTION

The present invention aims at eliminating the drawbacks found in the above-mentioned conventional technique. Accordingly, it is an object of the invention to provide a vice device which not only can stably support a crown member having a wide breadth but also can be simply applied to an existing compound miter saw.

In attaining the above object, according to the invention, there is provided a vice device structured such that a vice holder, which is mounted on a vice shaft fittable into a hole formed in the back surface of a fence and is capable of advancing and retreating a vice mounting body with a vice plate mounted on the leading end thereof, is made of a member composed of at least two side parts connected together at a given angle.

DETAILED DESCRIPTION OF THE PRESENT INVENTION

Now, description will be given below of an embodiment of a vice device according to the invention with reference to FIGS. 1 to 7.

In the present embodiment, in the central portion of a base 1, there is embedded a turn table 2 in such a manner that it can be rotated in the horizontal direction, while the upper surface of the turn table 2 is set flush with the upper surface of the base 1. On the upper surfaces of the base 1 and turn table 2, there can be set a workpiece such as a crown member 21 or a rectangular member 37. In the present invention, members (in the present embodiment, the base 1 and turn table 2) on which the workpiece can be set are generically referred to as a base part. On the upper surface of the base 1, there is fixed a fence 3 which is used to support the end face of the workpiece.

Figure 3:
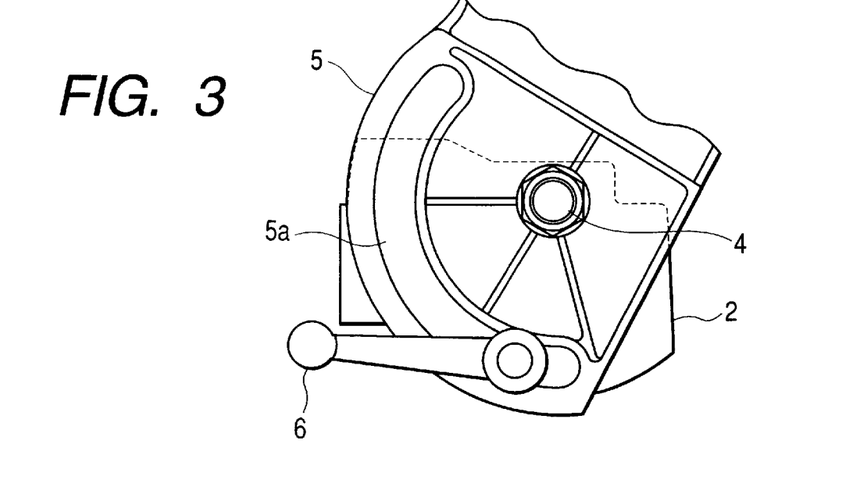
FIG. 3 is a partial back view of the compound miter saw, when it is viewed from the arrow mark A direction shown in FIG. 2.

On the rear end portion of the turn table 2, there is erected a holder 5 through a holder shaft 4, the axis of the holder shaft 4 is positioned so as to be almost identical with the upper surface of the turn table 2, and the holder 5 is supported on the base 1 in such a manner that it can be inclined right and left about the upper surface of the turn table 2 with the holder shaft 4 as a fulcrum thereof. As shown in FIG. 3, in the back portion of the holder 5, there is formed an elongated hole 5a extending so as to have the holder shaft 4 as a center thereof, a clamp lever 6 is disposed so as to penetrate the elongated hole 5a, a screw portion formed in the leading end portion of the clamp lever 6 is fitted with a screw hole portion formed in the back surface of the turn table 2. In case where the clamp lever 6 is loosened, the holder 5 is inclined within the range of the elongated hole 5a with the holder shaft 4 as a fulcrum thereof; and, in case where the clamp lever 6 is tightened, the holder 5 is tightened between the turn table 2 and clamp lever 6 so that it can be fixed at an arbitrary position between them. The elongated hole 5a is formed within the range where the holder 5 can be inclined right and left at an angle of 45°.

Figure 1:
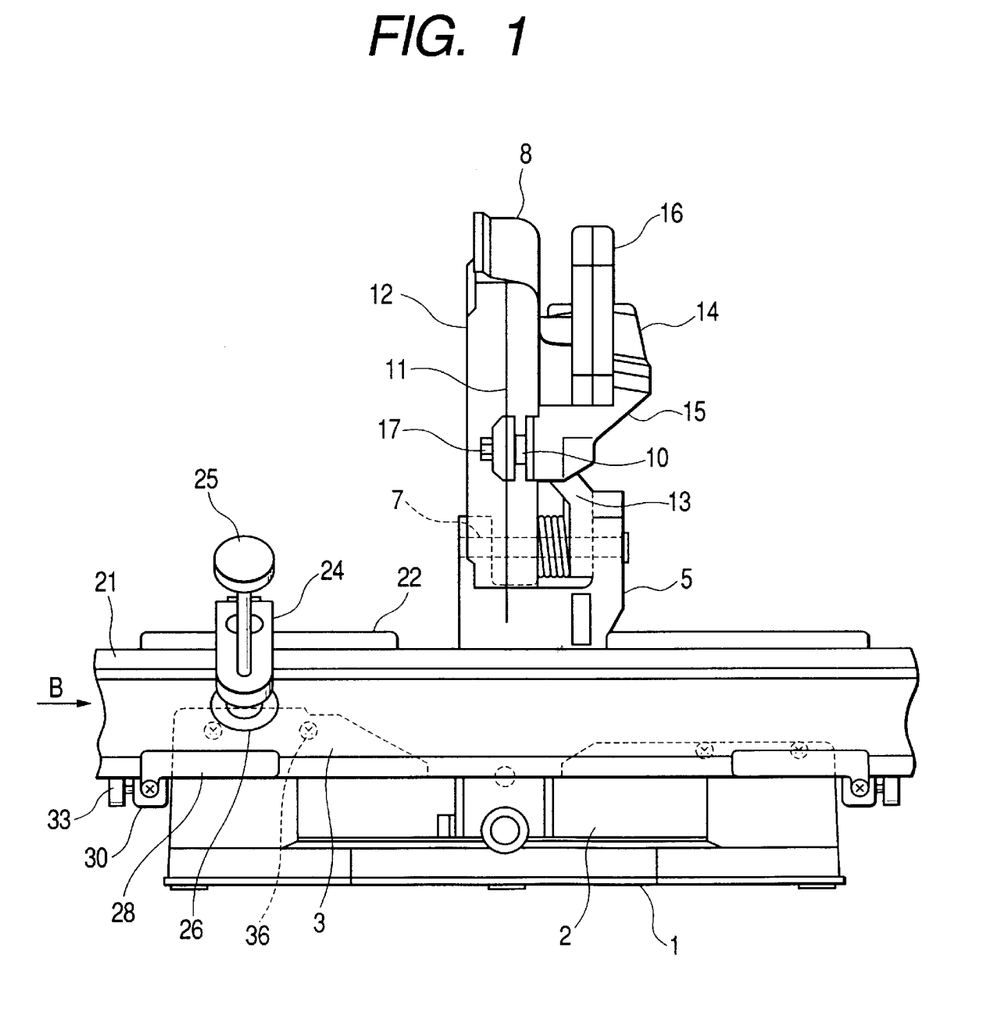
FIG. 1 is a front view of a compound miter saw incorporating therein a vice device according to a first embodiment of the invention.

Upwardly of the holder 5, there is supported a circular saw assembly 8 through a shaft 7 in such a manner that it can be swung up and down with respect to the base 1. Between the holder 5 and circular saw assembly 8, there is interposed a spring 9 which energizes the circular saw assembly 8 upwardly. The circular saw assembly 8 is composed of a saw shaft 10, a saw blade 11, a gear case 13 formed integral with a saw cover 12 for covering the upper half section of the saw blade 11, a motor 14 for driving and rotating the saw blade 11, a motor housing 15 for storing and supporting the motor 14 therein, and a handle 16. As shown in FIG. 1, on the gear case 13, there is disposed the saw shaft 10 which extends in the horizontal direction and, on the leading end portion of the saw shaft 10, there is mounted the saw blade 11 through a bolt 17. In the motor housing 15, there is incorporated a power transmission mechanism (not shown) such as a gear which is used to transmit power from the motor 14 to the saw blade 11.

Figure 9:
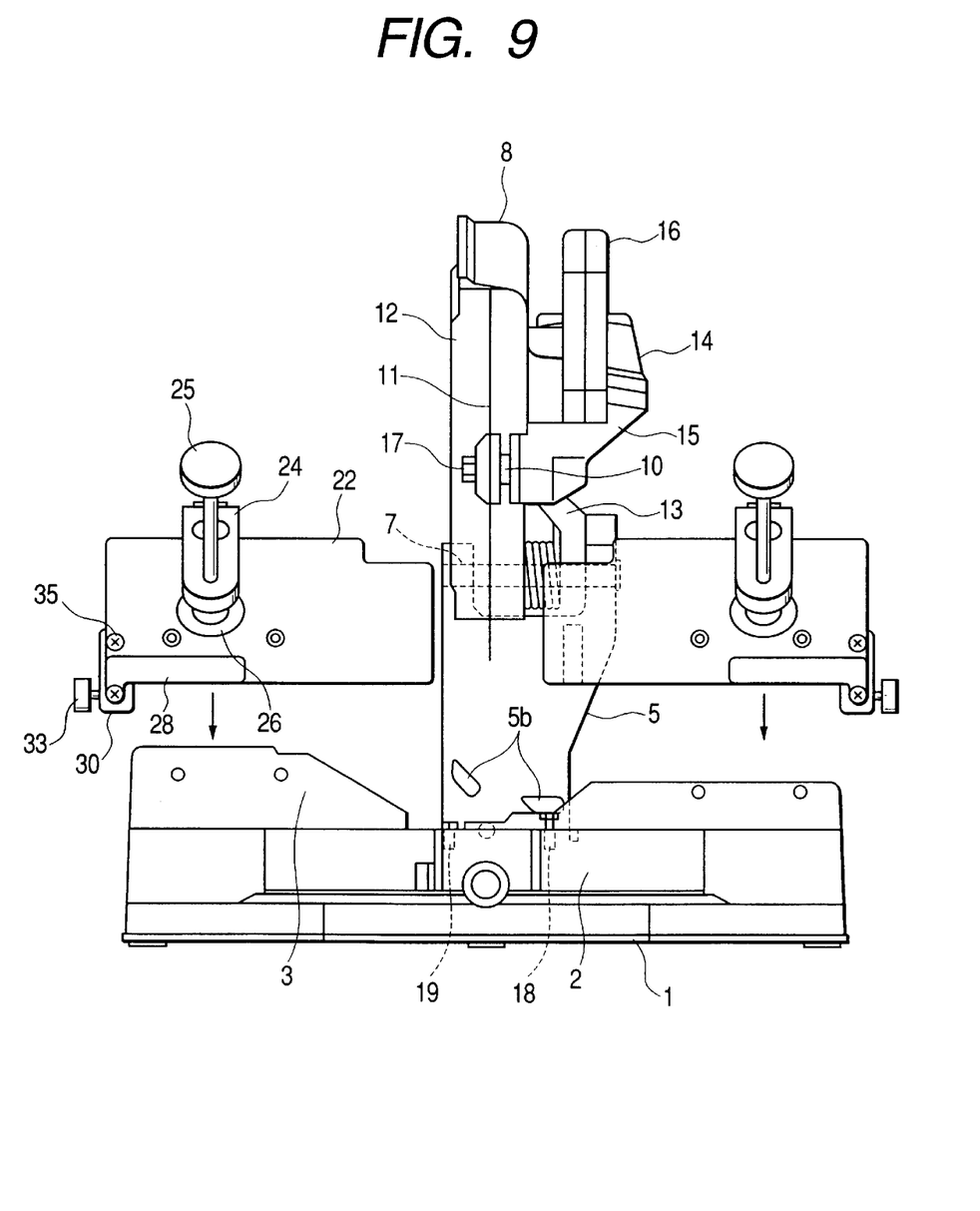
FIG. 9 is a front view of the compound miter saw, showing how to mount the vice device shown in FIG. 8 onto the compound miter saw.

On the front surface of the holder 5, there are disposed two projections 5b shown in FIG. 9 and, with the rear portion of the upper surface of the turn table 2, there are fitted stopper bolts 18, 19 at right angles in such a manner that they are positioned on the moving tracks of the projections 5b. In case where the clamp lever 6 is loosened and the holder 5 is then inclined, the projections 5b are engaged with the head portion of the stopper bolt 18 or with the head portion of the stopper bolt 19 at a given inclination angle to thereby set the inclined position of the circular saw assembly 8. Normally, the stopper bolts 18, 19 are disposed such that, when the holder 5 is inclined to a position of 45° in the right and left direction, they can be engaged with the projections 5b.

A plate 22, which is much higher than the fence 3, is fixed to a vice shaft 20 through two countersunk screws 34, the vice shaft 20 is inserted into an existing vice shaft mounting hole 3a formed in the back surface of the fence 3, and the vice shaft 20 is then fixed to the fence 3 through a knob bolt 23. The plate 22 is fixed to the fence 3 with a countersunk screw 36 using an existing screw hole formed in the front surface of the fence 3. By the way, the reason why this existing screw hole is formed is to mount an auxiliary fence onto the front surface of the fence 3 to thereby be able to turn the fence 3 into a fence having a large width or a fence having a large height.

When the crown member 21 is supported on the plate 22 while the former is obliquely put against the latter, a substantially inverted-L-shaped stopper holder 30, which is used to hold a stopper shaft 31 in such a manner that it can be moved back and forth, is fixed to the plate 22 through a countersunk screw 35; here, to the leading end portion of the stopper shaft 31, there is fixed through a screw 29 a stopper 28 which supports the front end of the crown member 21 in order to prevent the crown member 21 from falling down. On the stopper holder 30, there is disposed a knob bolt 33 which is used to fix the stopper shaft 31. The stopper shaft 31 is situated on the outside of the fence 3 in the right and left direction thereof and is mounted at a position below the upper surface of the base 1; and, the stopper 28 is set smaller in thickness than the plate 22 and thus, in case where the stopper 28 is moved most toward the plate 22 side, the stopper 28 can be prevented from projecting from the front surface of the plate 22. On the other end of the stopper shaft 31, there is disposed a C-shaped retaining ring 32 which is used to prevent the stopper shaft 31 against removal.

A vice holder 24, which consists of a member having two side parts connected together at a given angle, is fitted with and mounted to the upper end portion of the vice shaft 20. The vice holder 24 includes not only two holes 24a, 24b fittable with a projecting portion 20a formed in the vice shaft 20 but also a screw hole 24c fittable with a clamp screw 25 forming a vice mounting body according to the invention with a vice plate 26 mounted on the leading end portion thereof, while the hole 24b is formed so as to extend in parallel to the screw hole 24c. There is disposed a knob bolt 27 which is used to fix the vice holder 24 to the vice shaft 20 positively.

Figure 2:
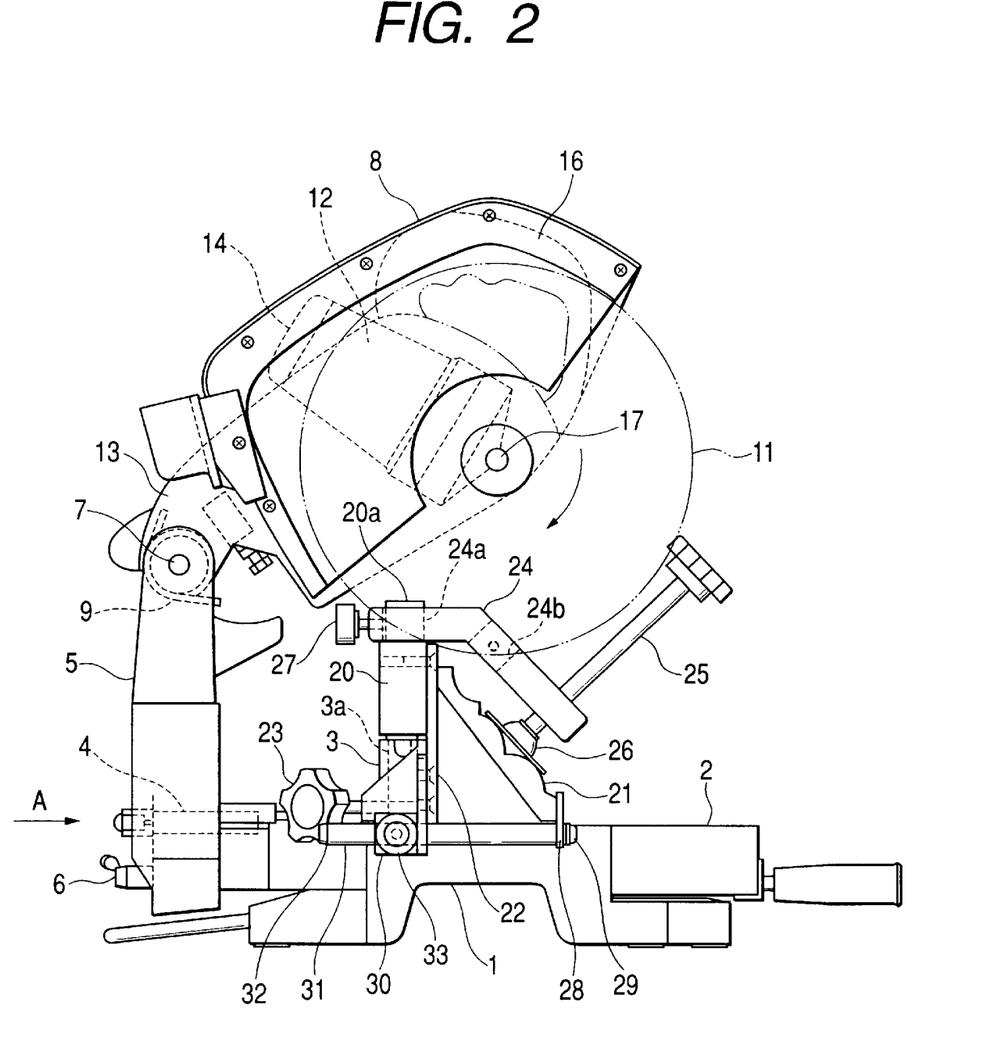
FIG. 2 is a side view of the compound miter saw shown in FIG. 1.
Figure 4:
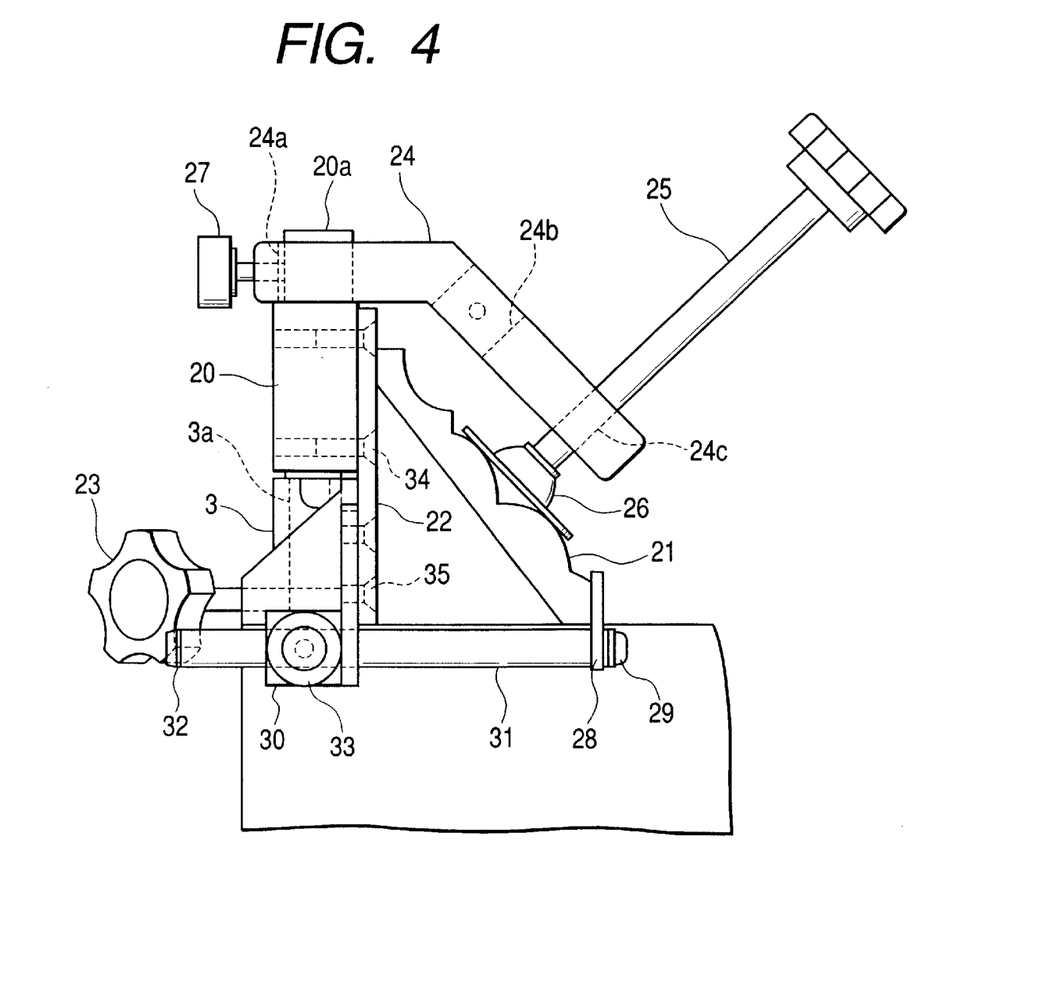
FIG. 4 is an enlarged view of the vice device, when it is viewed from the arrow mark B direction shown in FIG. 1.

In connection with the above-mentioned structure, description will be given below of a method for cutting the crown member 21 while it is obliquely put against the plate 22 with reference to FIGS. 1, 2 and 4.

Firstly, the upper end of the crown member 21 is contacted with the plate 22 in accordance with the support angle thereof. Next, the knob bolt 33 is loosened, the stopper 28 is then moved and is thereby contacted with the lower end portion of the crown member 21, and the stopper shaft 31 is fixed using the knob bolt 33. As shown in FIG. 4, the hole 24a of the vice holder 24 is fitted with the projecting portion 20a of the vice shaft 20, while the vice holder 24 is then fixed to the vice shaft 20 using the knob bolt 27. Finally, the clamp screw 25 is moved toward the crown member 21 and the crown member 21 is pressed and fixed by the vice plate 26. Due to this, the crown member 21 is fixed in a state where the support angle thereof is decided, that is, the crown member 21 is supported stably. In this state, the circular saw assembly 8 is pressed down using the handle 16 and the crown member 21 is cut using the saw blade 11.

Figure 5:
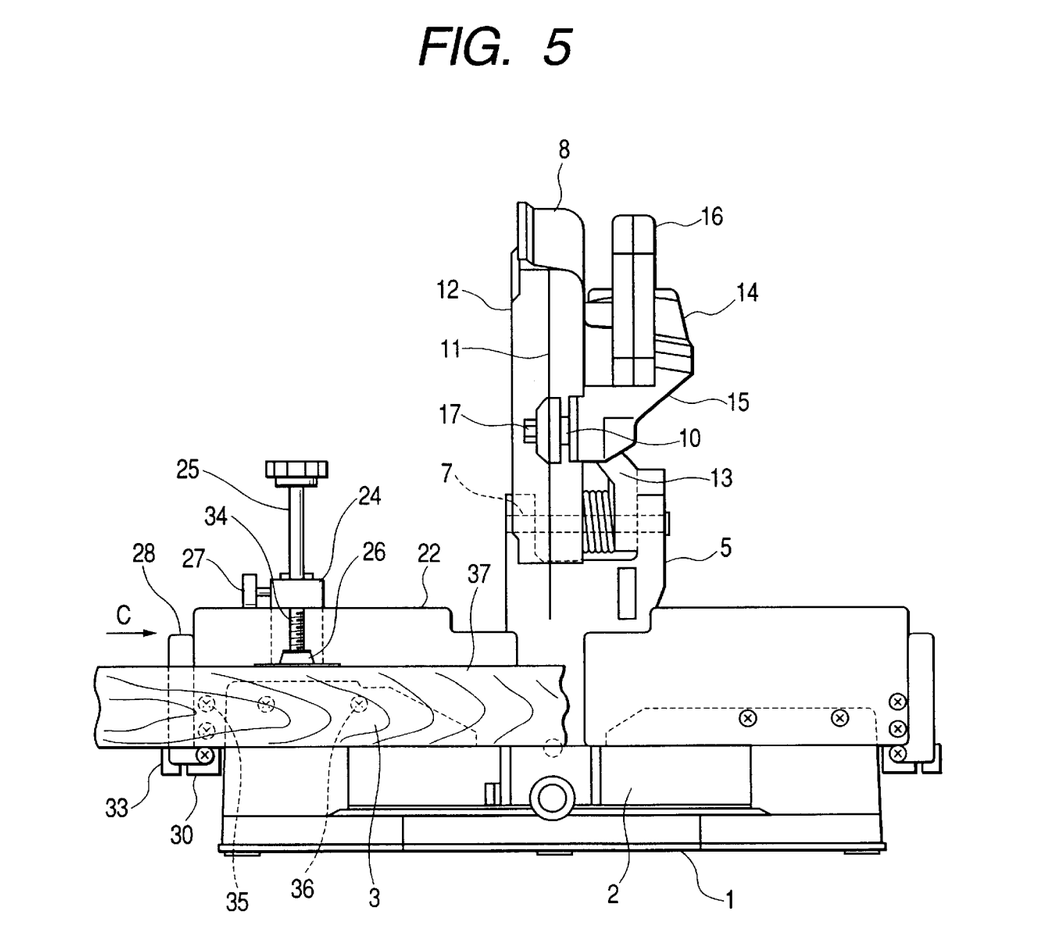
FIG. 5 is a front view of the compound miter saw, showing a state thereof where a rectangular member is supported.
Figure 6:
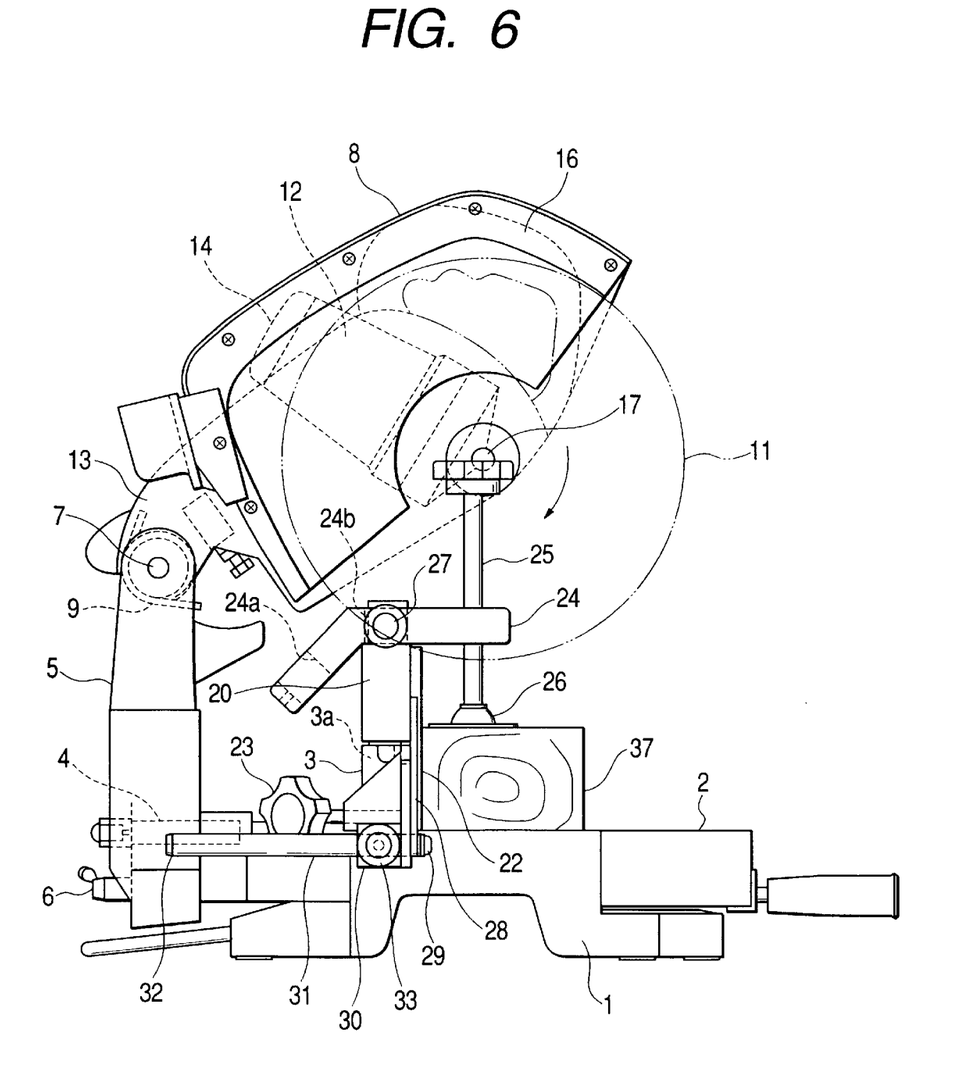
FIG. 6 is a side view of the compound miter saw shown in FIG. 5.
Figure 7:
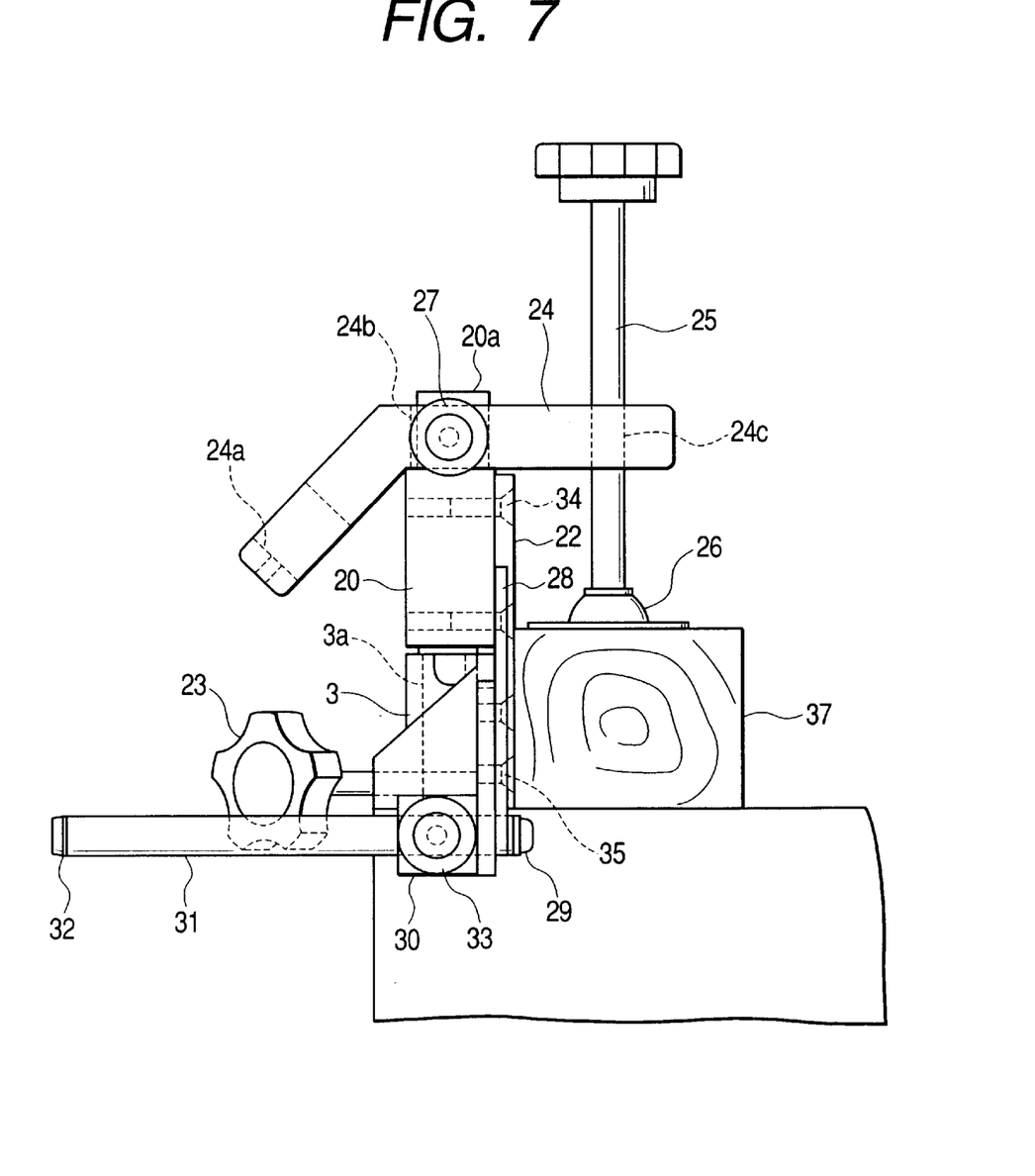
FIG. 7 is an enlarged view of the vice device, when it is viewed from the arrow mark C direction shown in FIG. 5.

Next, description will be given below of a case where a rectangular member 37 is cut with reference to FIGS. 5 to 7.

Firstly, the knob bolt 33 is loosened, the stopper shaft 31 is moved to the plate 22 side and the stopper 28 is rotated to the outside, and, using the knob bolt 33, the stopper 28 is fixed at a position where the stopper 28 does not project from the plate 22. Next, the knob bolt 27 is loosened, the vice holder 24 is removed from the projecting portion 20a of the vice shaft 20 and is changed in position as shown in FIG. 7 to thereby bring the hole 24b of the vice holder 24 into engagement with the projecting portion 20a, the vice holder 24 is fixed again using the knob bolt 27, and, finally, the clamp screw 25 is pressed down and the rectangular member 37 is pressed and fixed by the vice plate 26. Due to this, the rectangular member 37 is fixed and is stably supported. In this state, the circular saw assembly 8 is pressed down using the handle 16 and the rectangular member 37 is cut using the saw blade 11.

According to the above-mentioned embodiment, by a simple modification that the screw holes for mounting the plate 22 are formed in the existing vice shaft 20 and the stopper holder 30 is mounted on the plate 22, a vice device according to the invention can be applied to the existing compound miter saw; and also, by a simple operation to switch the fitting holes of the vice holder 24 with the vice shaft 20, the crown member 21 and rectangular member 37 can be positively pressed against the plate 22 and the base 1 and turn table 2, 50 that these workpieces can be stably supported on the plate 22.

Figure 8:
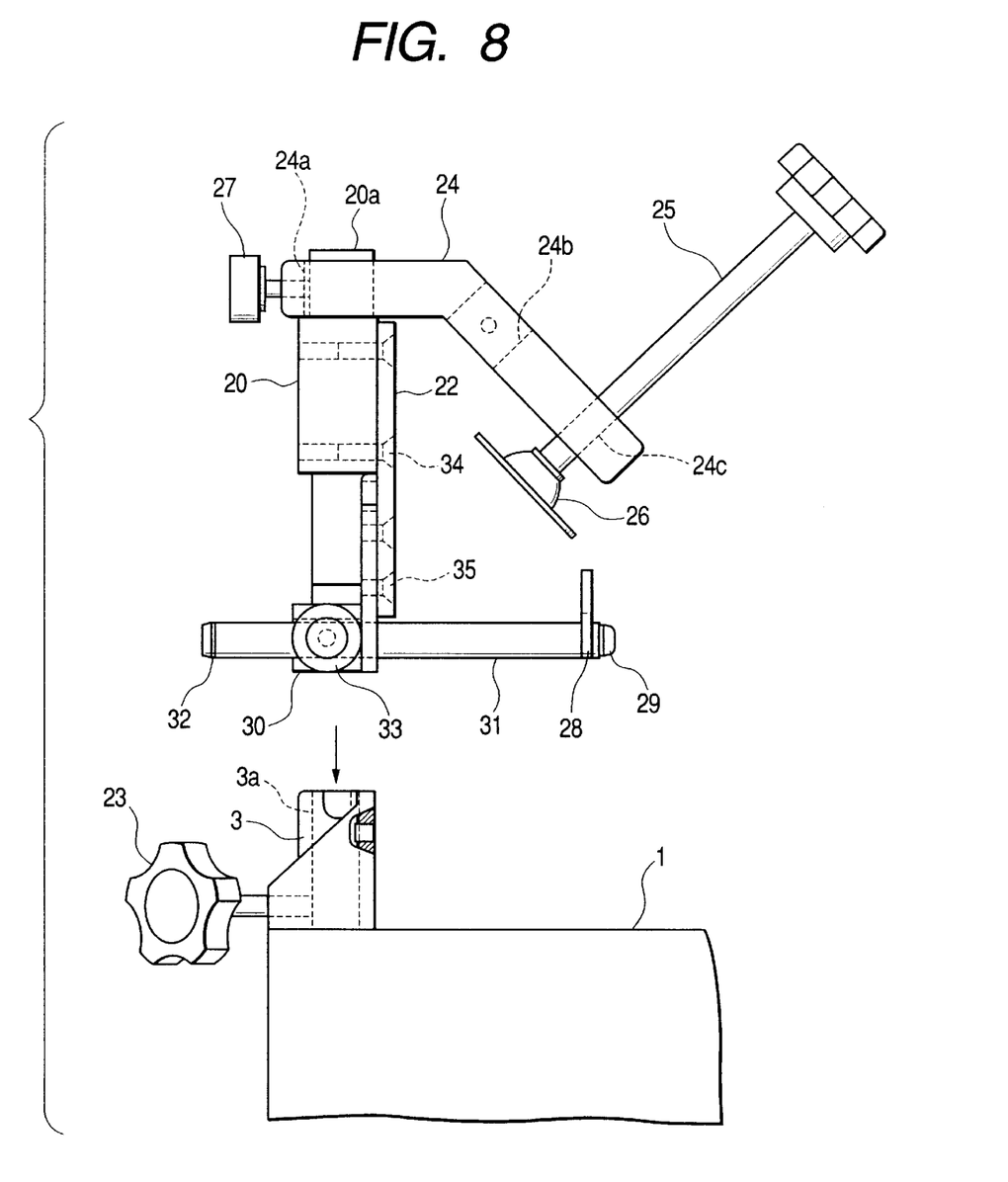
FIG. 8 is a side view of a second embodiment of a vice device according to the invention.

Now, FIGS. 8 and 9 respectively show a second embodiment of a vice device according to the invention. In the present embodiment, on the above-mentioned vice shaft 20, there are mounted a plate 22, a stopper holder 30 through the plate 22, and a stopper shaft 31 and a stopper 28 through the stopper holder 30. And, these elements are united together as an integral part and, in the state of the integral part, the vice shaft 20 is fitted into a hole formed in the back surface of the fence 3, thereby being able to structure the present vice device. According to this structure, there can be obtained an effect that the vice device can be applied to an existing compound miter saw more simply.

In the above-mentioned embodiments, the plate 22 and stopper holder 30 are produced as separate parts and, after production, they are united together using the countersunk screw 35. However, the plate 22 and stopper holder 30 may also be formed as an integral part and, in this case, the structure of the vice device can be further simplified.

As has been described heretofore, according to the invention, a crown member and an ordinary rectangular member can be supported stably using a single vice holder. Also, the present vice device can be simply applied to an existing compound miter saw by few modifications and an operation to apply the vice device to the existing compound miter saw can also be simplified.

What is claimed is:

1. A compound miter saw comprising:

a base portion having an upper surface on which a workpiece to be cut is mounted;

a fence supported on the upper surface of the base portion, the fence supporting an end face of the workpiece, the fence having a back surface on which a hole is defined;

a holder disposed in rear of the base portion;

a circular saw assembly having a saw blade and a motor for driving the saw blade, the circular saw assembly supported on the upper end of the holder to be rotatable in the vertical direction;

a vice shaft fittable with the hole of the back surface of the fence;

a vice holder mounted on the vice shaft, the vice holder having two portions connected together at a predetermined angle, each of the two portions defining a respective mounting hole; and a vice mounting body fittable to the vice holder, the vice mounting body being movable in forward and backward directions;

a vice plate mounted on the leading end of the vice mounting body, wherein the circular saw assembly is pressed down so that the saw blade cuts the workpiece on the upper surface of the base portion; and the vice holder is detachably fixed to the vice shaft through one of the mounting holes of the vice holder, so that the pressure angle of the vice plate with respect to the workpiece is changeable.

2. The compound miter saw as claimed in claim 1, further comprising a stopper projecting upwardly of the upper surface of the base portion and extending along a transverse direction of the fence to support the counter-fence-side front end of the workpiece on the upper surface of the base portion.

3. The compound miter saw as claimed in claim 2, further comprising a stopper holder situated outside in the transverse direction of the fence for supporting the stopper to be movable in forward and backward directions with respect to the fence and to be rotatable.

4. The compound miter saw as claimed in claim 3, wherein the stopper is retreatable from the front surface of the fence and from the upper surface of the base portion.

5. The compound miter saw as claimed in claim 1, wherein a clamp screw threadedly engaged with one of the two portions of the vice holder forms the vice mounting body.

6. The compound miter saw as claimed in claim 5, wherein one of the mounting holes formed in the two portions of the vice holder is arranged in parallel to the clamp screw.

7. The compound miter saw as claimed in claim 2, further comprising a plate formed higher than the fence, the plate disposed on the vice shaft.

8. The compound miter saw as claimed in claim 7, wherein the thickness of the stopper is set smaller than that of the plate.

9. The compound miter saw as claimed in claim 1, wherein the base portion comprises a turntable incorporated in the base portion.

10. The compound miter saw as claimed in claim 1, further comprising a holder shaft connecting the holder with the base portion, wherein the holder is rotatable with respect to the holder shaft.

* * * * *